(12) United States Patent
Du et al.

(10) Patent No.: US 10,447,108 B2
(45) Date of Patent: Oct. 15, 2019

(54) DISTRIBUTED CONNECTION RING ASSEMBLY FOR STATOR ASSEMBLY

(71) Applicant: GM GLOBAL TECHNOLOGY OPERATIONS LLC, Detroit, MI (US)

(72) Inventors: Xiaohui Du, West Bloomfield, MI (US); Robert T. Dawsey, Rochester Hills, MI (US); Edward L. Kaiser, Orion, MI (US); Paul Buchholz, Warren, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 313 days.

(21) Appl. No.: 15/439,025

(22) Filed: Feb. 22, 2017

(65) Prior Publication Data

US 2018/0241277 A1    Aug. 23, 2018

(51) Int. Cl.
| | |
|---|---|
| *H02K 3/28* | (2006.01) |
| *H02K 3/50* | (2006.01) |
| *H02K 3/52* | (2006.01) |
| *H02K 5/22* | (2006.01) |

(52) U.S. Cl.
CPC .............. *H02K 5/225* (2013.01); *H02K 3/28* (2013.01); *H02K 3/50* (2013.01); *H02K 3/521* (2013.01); *H02K 2203/09* (2013.01)

(58) Field of Classification Search
CPC H02K 5/225; H02K 3/50; H02K 3/28; H02K 3/521; H02K 2203/09
USPC .................................................. 310/68 D, 71
See application file for complete search history.

(56) References Cited

U.S. PATENT DOCUMENTS

| | | | | |
|---|---|---|---|---|
| 6,198,188 | B1* | 3/2001 | Ihata ................... | H02K 11/046 310/68 D |
| 6,275,404 | B1* | 8/2001 | Shichijyo ............ | H02K 11/046 310/68 D |
| 6,600,244 | B2* | 7/2003 | Okazaki ................ | H02K 3/522 310/71 |
| 10,211,699 | B2* | 2/2019 | Fukunaga ............. | H02K 3/522 |
| 10,340,761 | B2* | 7/2019 | Turnbull ................ | H02K 3/50 |
| 2008/0122310 | A1* | 5/2008 | Joho ....................... | H02K 3/14 310/201 |
| 2014/0028127 | A1* | 1/2014 | Chamberlin .......... | H02K 3/522 310/71 |
| 2016/0020660 | A1* | 1/2016 | Houzumi .............. | H02K 3/522 310/71 |

(Continued)

*Primary Examiner* — John K Kim
(74) *Attorney, Agent, or Firm* — Quinn IP Law

(57) ABSTRACT

A distributed connection ring assembly can be used in a stator assembly and can integrate a neutral connector and jumping winding connections in an overmolded assembly for insulation. The stator assembly including a stator core defining a plurality of slots spaced apart from each other, a plurality of bar conductors disposed in each of the slots, and a distributed connection ring assembly secured to the jumping winding connections. The distributed connection ring assembly includes an overmolded neutral connector. The distributed connection ring assembly also includes a plurality of overmolded couplers circumferentially spaced apart from one another. The overmolded couplers are coupled to the overmolded neutral connector. Each of the plurality of overmolded couplers includes a support body and a plurality of stator conductors partially disposed inside the support body. The stator conductors are electrically connected to the jumping winding connections.

7 Claims, 5 Drawing Sheets

(56) References Cited

U.S. PATENT DOCUMENTS

2016/0285334 A1\* 9/2016 Turnbull .................. H02K 3/50
2018/0241277 A1\* 8/2018 Du .......................... H02K 3/28

\* cited by examiner

DISTRIBUTED CONNECTION RING ASSEMBLY FOR STATOR ASSEMBLY

TECHNICAL FIELD

The present teachings generally relate to a distributed connection assembly for securing jumping winding connections of a stator assembly of an electric machine.

BACKGROUND

An electric machine includes a stator and can convert electrical energy into mechanical energy, or vice-versa. For instance, an electric machine can covert an alternating current into mechanical energy.

SUMMARY

The presently distributed connection assembly is used in a stator assembly of an electric machine and can integrate a neutral connection and jumping winding connections in an overmolded assembly for insulation. The present application describes a stator assembly including a stator core defining a plurality of slots spaced apart from each other, a plurality of bar conductors disposed in each of the slots, a plurality of jumping winding connections coupled to the stator core; and a distributed connection assembly secured to the jumping winding connections. The distributed connection assembly includes an overmolded neutral connector. The distributed connection assembly also includes a plurality of overmolded couplers circumferentially spaced apart from one another. The overmolded couplers are coupled to the overmolded neutral connector. Each of the plurality of overmolded couplers includes a support body and a plurality of stator conductors partially disposed inside the support body. The stator conductors are electrically connected to the jumping winding connections. The support body is made of a polymeric material. The stator conductors are made of an electrically conductive material.

According to an aspect of the present disclosure, the overmolded neutral connector may have an arcuate shape. Each of the overmolded couplers may have an arcuate shape that is complementary to the arcuate shape of the overmolded neutral connector. In other words, the arcuate shape of the overmolded couplers follow (or have the same curvature as) the arcuate shape of the overmolded neutral connector. The support body may include a main body having an inner body surface and an outer body surface opposite the inner body surface. The outer body surface has a convex shape. The inner outer surface of the main body may have a concave shape. The support body may include a first end portion and a second end portion opposite the first end portion. The main body is disposed between the first end portion and the second end portion. The first end portion has a width that is smaller than a width of the main body. The second end portion of the support body may be larger than the main body.

The stator conductors includes a first bar conductor. The first bar conductor may extend solely through the first end portion of the main body. The stator conductors includes a second bar conductor. The second bar conductor may extend solely through the main body and the second end portion. As a non-limiting example, the overmolded couplers may include solely three overmolded couplers. The second end portion includes two coupling prongs spaced apart from each other to define a recess. The stator assembly may further include a plurality of terminals and a plurality of electrical leads. Each of the electrical leads is electrically connected to a respective terminal. The recess is sized to partially receive one of the electrical leads.

According to another aspect of the present disclosure, a nested connection assembly can also be used with a stator assembly. The nested connection assembly includes an overmolded neutral connector and a plurality of overmolded couplers coupled to the overmolded neutral connector. Each of the overmolded couplers includes a support body and a plurality of stator conductors coupled to the support body. The overmolded couplers are nested with each other and with the overmolded neutral connector. As a non-limiting example, the nested connection assembly may solely include two overmolded couplers coupled on top of each other. The overmolded couplers are placed on top of the overmolded neutral connector.

The above features and advantages and other features and advantages of the present teachings are readily apparent from the following detailed description of the best modes for carrying out the teachings when taken in connection with the accompanying drawings.

DETAILED DESCRIPTION

Figure 2:
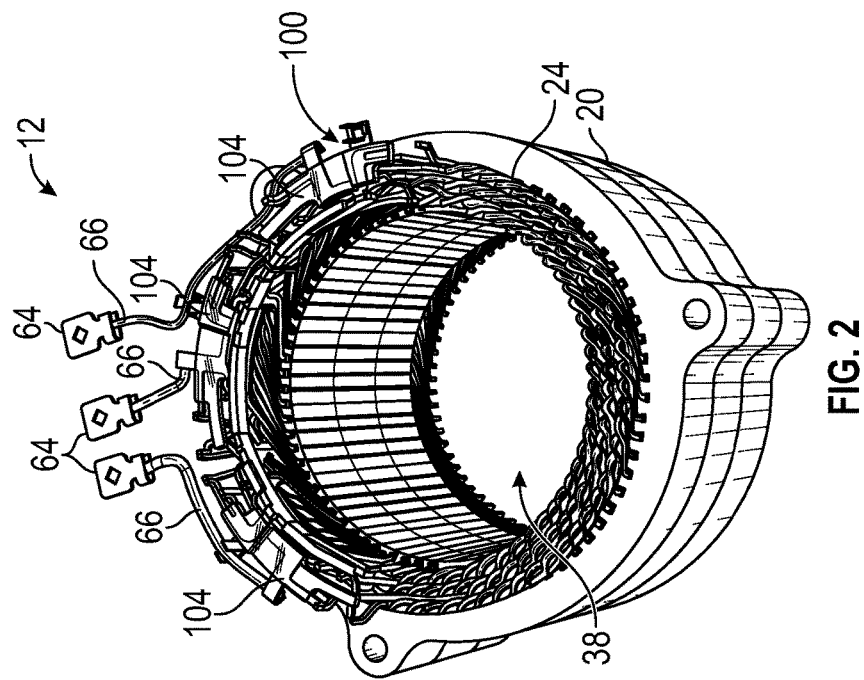
FIG. 2 is a schematic perspective view of the stator assembly of the electric machine schematically illustrated in FIG. 1, wherein the stator assembly includes a distributed connection assembly.
Figure 1:
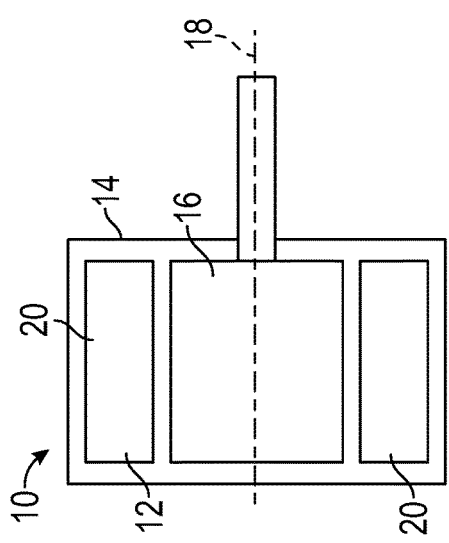
FIG. 1 is a schematic plan view of an electric machine including a stator assembly and a rotor.

Referring to the drawings, wherein like reference numbers correspond to like or similar components throughout the several figures, and beginning with FIGS. 1 and 2, an electric machine 10 includes a stator assembly 12 and a rotor 16 operatively coupled to the stator assembly 12. The electric machine 10 can be utilized in a vehicle. The vehicle can be a passenger vehicle, a commercial vehicle, or any other suitable vehicle capable of carrying people or objects. For example, the vehicle can be a battery electric vehicle, a hybrid electric vehicle including a plug-in hybrid electric vehicle, an extended range electric vehicle or any other suitable vehicles. The electric machine 10 can include, but is not limited to, an electric motor, a traction motor or other similar device. For example, the electric machine 10 can be a permanent magnet motor, an induction motor, synchronous motor, etc. The electric machine 10 can include any device configured to generate an electric machine torque by, for example, converting electrical energy into rotational motion. The electric machine 10 can be configured to receive electrical energy from a power source, such as a battery array. The power source can be configured to store and output electrical energy.

The vehicle can include an inverter for converting the direct current (DC) voltage from the battery array into alternating current (AC) voltage. The electric machine 10 can be configured to use the AC voltage from the inverter to generate rotational motion. The electric machine 10 can also be configured to generate electrical energy when provided with mechanical energy, such as the mechanical energy (torque) of an engine.

Referring to FIG. 1, the electric machine 10 can include a housing 14. The housing 14 can be manufactured from any suitable material, including but not limited to aluminum, and can include any suitable size, shape and/or configuration suitable to house the internal components of the electric machine 10. For example, the stator assembly 12 is supported by the housing 14. Specifically, the stator assembly 12 is fixed relative to the housing 14. In other words, the stator assembly 12 is stationary relative to the housing 14.

The electric machine 10 also includes a rotor 16 rotatably supported by the housing 14. The rotor 16 can rotate relative to the stator assembly 12 about a longitudinal axis 18. The rotor 16 can include, for example, windings or permanent magnets that interact with the poles of the stator assembly 12 to generate rotation of the rotor 16 relative to the stator assembly 12. The rotor 16 can be an interior permanent magnet, a surface permanent magnet, an induction, synchronous, reluctance or a separately-excited/wound-field rotor. The rotor 16 is shown schematically in FIG. 1 for illustrative purposes only.

Figure 3:
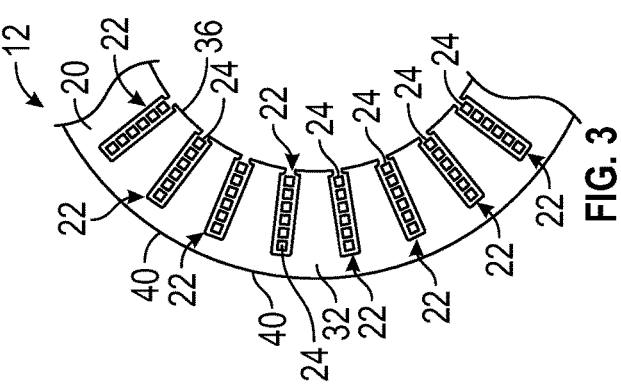
FIG. 3 is a schematic fragmentary end view of a stator core of the stator assembly shown in FIG. 2.

Referring to FIGS. 1, 2 and 3, the stator assembly 12 further includes a stator core 20 defining a plurality of slots 22 (see FIG. 3) spaced from each other. The stator assembly 12 also includes a plurality of bar conductors 24 (FIG. 2) disposed in each of the slots 22 and arranged in one or more winding paths. The electric machine 10 can operate in response to voltage applied to the winding paths from the inverter, which creates torque-producing current in the winding paths which causes the rotor 16 to rotate. The bar conductors 24 are sometimes referred to as hairpin conductors, and can be a substantially rectangular cross-section.

The stator core 20 extends between a first core end 32 and a second core end 34 along the longitudinal axis 18. The slots 22 are spaced from each other circumferentially about the longitudinal axis 18 and each extends between the first and second core ends 32, 34 of the stator core 20. Therefore, the slots 22 can extend lengthwise along the longitudinal axis 18. In certain embodiments, there are exactly seventy-two slots 22 defined in the stator core 20, and the stator core 20 defines eight poles.

The stator core 20 can include an inner stator wall 36 defining a stator hole 38 along the longitudinal axis 18 such that the inner stator wall 36 is spaced radially away from the longitudinal axis 18. The rotor 16 is disposed in the stator hole 38 of the stator core 20 and is rotatable relative to the inner stator wall 36 of the stator core 20 when current is traveling through the stator core 20. Furthermore, the slots 22 can intersect the inner stator wall 36. The stator core 20 can also include an outer stator wall 40 opposing the inner stator wall 36. Therefore, the inner stator wall 36 and the outer wall 40 are spaced from each other transverse to the longitudinal axis 18. As such, the inner stator wall 36 defines an inner diameter, and the outer stator wall 40 defines an outer diameter greater than the inner diameter. The stator assembly 12 also includes a plurality of electrical jumper wires 60 electrically connected to a predetermined number of the bar conductors 24 in order to control the amount of current flowing through winding paths. The electrical jumper wires 60 have jumping winding connections 61 electrically connected to the terminals 64 to direct or transfer current into the stator core 20. The jumping winding connections 61 (along with the electrical jumper wires 60) are mechanically coupled to the stator core 20. The terminals 64 are configured to be electrically connected to the power source (e.g., a battery pack). Electrical leads 66 are electrically connected the terminals 64, and at least some of the jumper wires 60 are electrically connected to the bar conductors 24.

With reference to FIGS. 2 and 4-6, the stator assembly 12 also includes a distributed connection assembly 100 that can support the electrical leads 66 and electrically connect the terminals 64 to the jumping winding connections 61. The distributed connection assembly 100 includes an overmolded neutral connector 102. The overmolded neutral connector 102 includes a semi-annular shape to closely follow the shape of the stator core 20, thereby facilitating packaging inside a vehicle or any other housing. The distributed connection assembly 100 also includes a plurality of overmolded couplers 104 circumferentially spaced apart from one another to facilitate packaging the stator assembly 12 inside a vehicle of any other housing. The overmolded couplers 104 are identical to each other to facilitate manufacturing and are coupled to the overmolded neutral connector 102. As a non-limiting example, the distributed connection assembly 100 includes solely three identical overmolded couplers 104 to minimize part count while achieving the necessary electrical connections. These three overmolded couplers 104 are discrete components.

Figure 4:
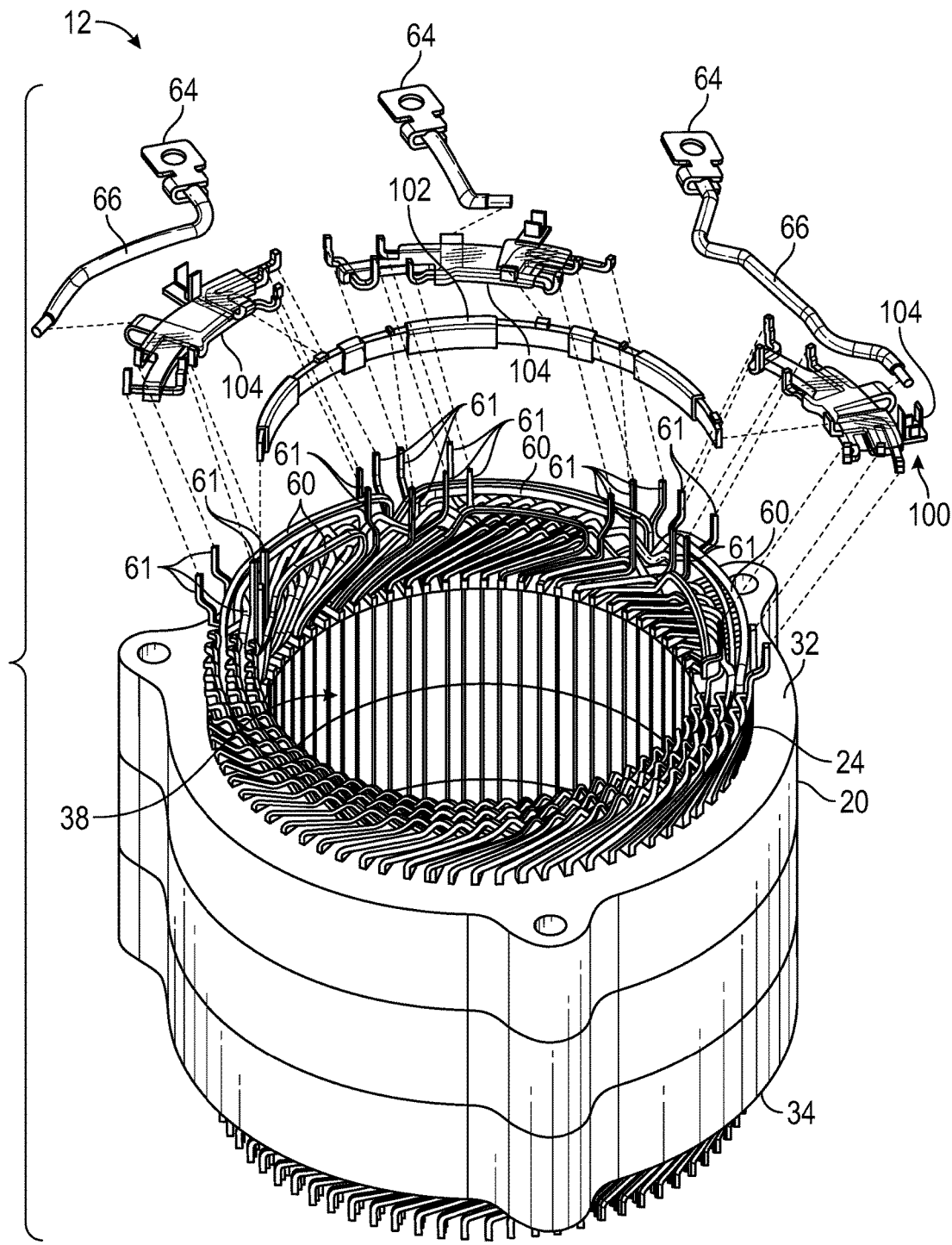
FIG. 4 is a schematic perspective, exploded view of the stator assembly of the electric machine schematically illustrated in FIG. 2.
Figure 5:
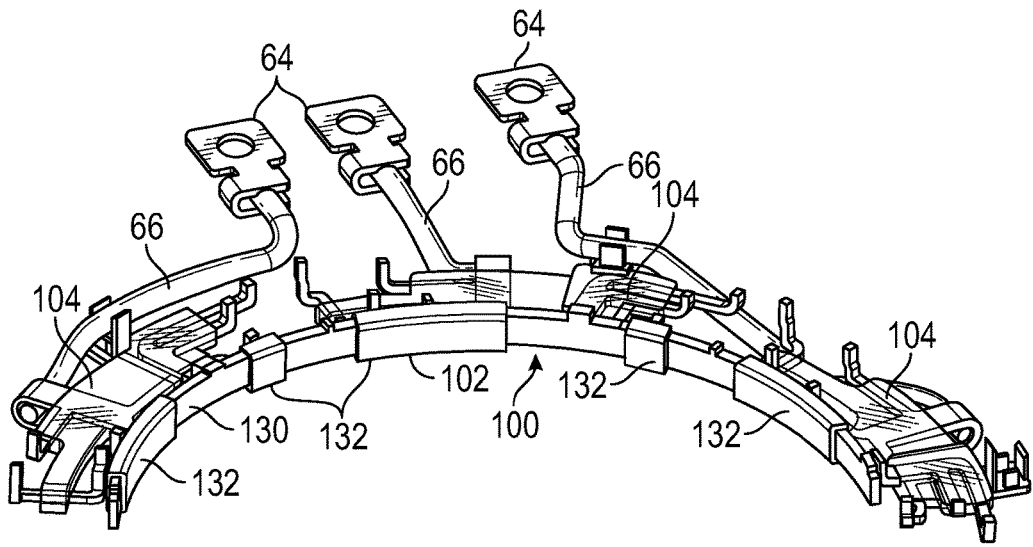
FIG. 5 is a schematic, perspective view of the distributed connection assembly shown in FIG. 2, wherein the distributed connection assembly includes a plurality of overmolded couplers.
Figure 6:
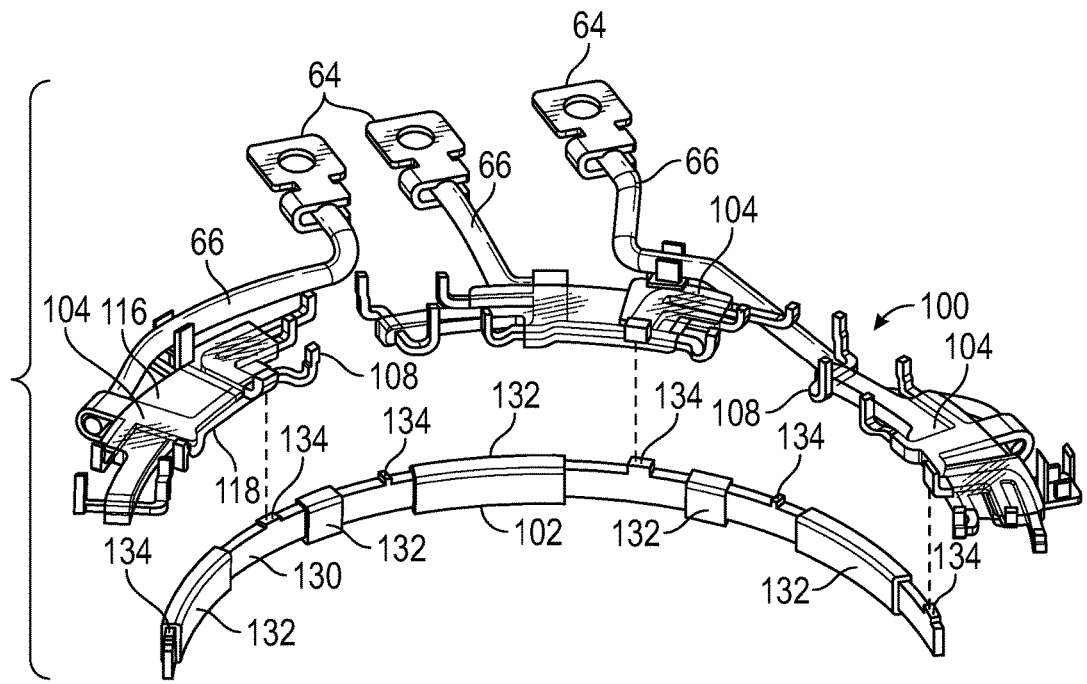
FIG. 6 is a schematic, perspective, exploded view of the distributed connection assembly shown in FIG. 2.
Figure 7:
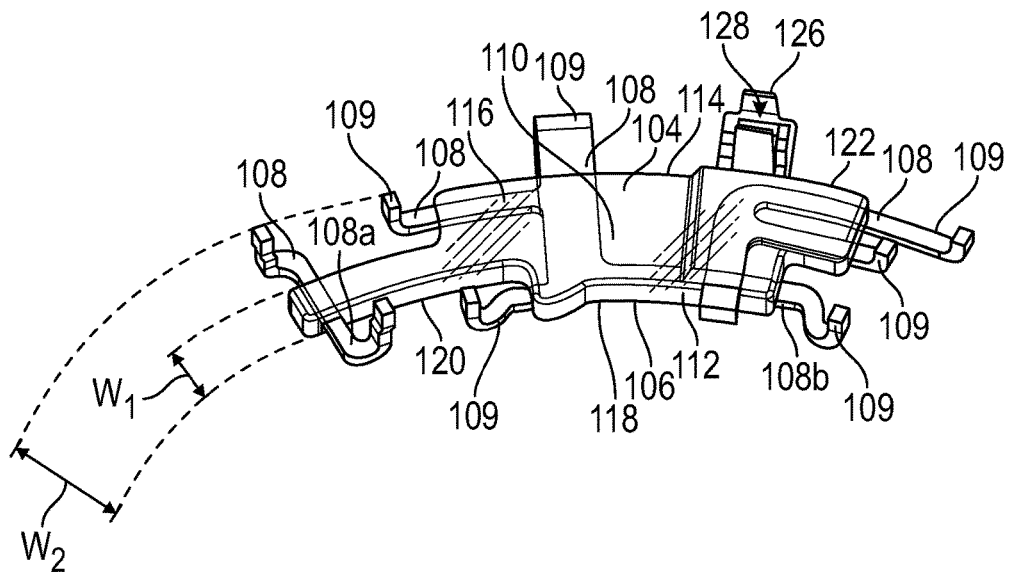
FIG. 7 is a schematic top view of one of the overmolded couplers of the distributed connection assembly shown in FIG. 2.
Figure 8:
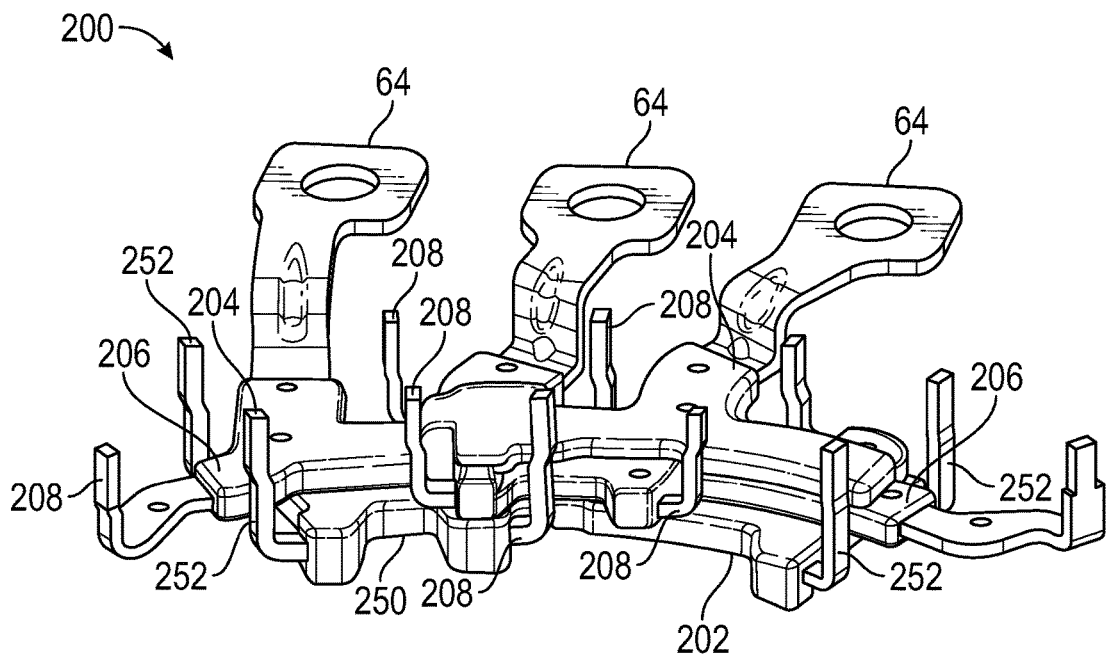
FIG. 8 is a schematic, perspective view of a nested connection assembly.

With reference to FIGS. 5-7, each overmolded coupler 104 includes a support body 106 and a plurality of stator conductors 108 partially disposed inside the support body 106. The polymeric support body 106 is wholly or partly made of a polymeric material and therefore does not conduct electricity. The stator conductors 108 are made of an electrically conductive material, such as metal, and therefore conduct electricity. The stator conductors 108 are electrically connected to the jumping winding connections 61 and the electrical leads 66. As a result, electrical current can be transferred from the terminals 64 to the bar conductors 24 through the electrical jumper wires 60 (FIGS. 2 and 4). The polymeric support body 106 may have an arcuate shape that is complementary to the arcuate shape of the overmolded neutral connector 102 to facilitate the connection between the overmolded couplers 104 and the overmolded neutral connector 102. In particular, the polymeric support body 106 includes a main portion 110 having an inner body surface 112 and an opposite, outer body surface 114. The overmolded neutral connector 102 is closer to the inner body surface 112 than to the outer body surface 114 of the main portion 110. The outer body surface 114 of the main portion 110 has a convex shape, and the inner body surface 112 of the main portion 110 has a concave shape, thereby allowing the polymeric support body 106 to be positioned relatively close to the overmolded neutral connector 102. As a result, the space occupied by the distributed connection assembly 100 is minimized. The main portion 110 has a top body surface 116 and an opposite, bottom body surface 118. The top body surface 116 and the bottom body surface 118 are both flat to minimize the space occupied by the overmolded coupler 104.

Each polymeric support body 106 further includes first end portion 120 and a second end portion 122 opposite the first end portion 122. The main portion 110 is disposed between the first end portion 120 and the second end portion 122. Thus, the first end portion 120 protrudes directly from the main portion 110 of the polymeric support body 106. The width W1 of the first end portion 120 is smaller than the width W2 of the main portion 110 to minimize space and weight of the overmolded coupler 104. Each overmolded coupler 104 may include one or more stator conductors 108. As a non-limiting example, a first bar conductor 108a extends only through the first end portion 120 of the polymeric support body 106 in order to be electrically isolated from other stator conductors 108 extending through the polymeric support body 106. Each overmolded coupler 104 also includes a second bar conductor 108b with multiple branches 109. The second bar conductor 108b extends only through the main portion 110 and the second end portion 122 and is therefore electrically isolated from the first bar conductor 108a. The second end portion 122 is larger than the main portion 110 and includes two coupling prongs 126. The two coupling prongs 126 are spaced apart from each other to define a recess 128 configured, shaped, and sized to partially receive one electrical lead 66. Accordingly, the electrical leads 66 can be mechanically coupled to the overmolded coupler 104. The electrical leads 66 are electrically coupled to one of the branches 109 of the second bar conductor 108b.

The overmolded neutral connector 102 includes a main connector body 130 wholly or partly made of an electrically conductive material, such as metal. In addition, the overmolded neutral connector 102 includes isolation coverings 132 disposed around portions of the main connector body 130. The isolation coverings 132 are wholly or partly made of a polymeric material or any other suitable electrically isolation material in order to provide electrical isolation where desired. The overmolded neutral connector 102 also includes protrusions 134 extending directly from the main connector body 130. The protrusions 134 are wholly or partly made of an electrically conductive material, such as metal, and are configured to be electrically connected to the stator conductors 108. The protrusions 134 are circumferentially spaced apart from each other in order to facilitate the electrical connection between the stator conductors 108 and the protrusions 134.

Figure 9:
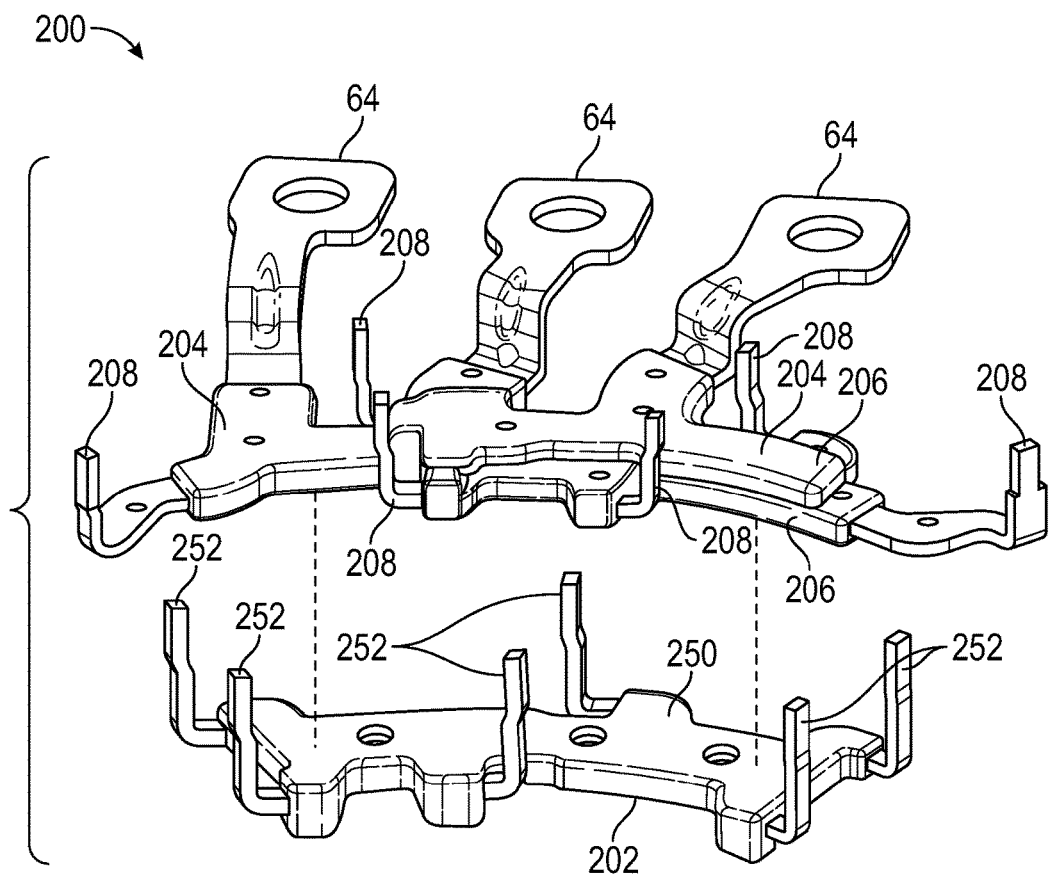
FIG. 9 is a schematic, perspective, exploded view of the nested configuration assembly of FIG. 8.

With reference to FIGS. 9 and 10, a nested connection assembly 200 can be used with the stator assembly 12 and includes a plurality of overmolded couplers 204 and an overmolded neutral connector 202. Each of the plurality of overmolded couplers 204 includes a support body 206 and a plurality of stator conductors 208 coupled to the support body 206. The support body 206 is wholly or partly made of an electrically insulating material, such as a polymer, and the stator conductors 208 are wholly or partly made of an electrically conductive material, such as a metal. The stator conductors 208 are electrically connected to the terminals 64. The overmolded couplers 204 are nested with each other and with the overmolded neutral connector 202. To facilitate nesting, the support body 206 of each overmolded coupler 204 may have a planar shape. Thus, the overmolded couplers 204 are disposed on top of each other. The overmolded neutral connector 202 includes a connection body 250 wholly or partly made of an electrically insulation material, such as a polymer. In addition, the overmolded neutral connector 202 includes a neutral conductor 252 coupled to the connection body 250. The neutral conductors 252 are wholly or partly made of an electrically conductive material, such as metal. The connection body 250 is flat to facilitate nesting with the overmolded couplers 204. As a non-limiting example, the nested connection assembly 200 may solely include two overmolded couplers 204 disposed on top of each other. The two overmolded couplers 204 may be placed on top of the overmolded neutral connector 202.

While the best modes for carrying out the teachings have been described in detail, those familiar with the art to which this disclosure relates will recognize various alternative designs and embodiments for practicing the teachings within the scope of the appended claims. The distributed connection assembly and the nested connection assembly illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings.

The invention claimed is:

1. A stator assembly, comprising:
a stator core defining a plurality of slots spaced apart from each other;
a plurality of bar conductors disposed in each of the slots;
a plurality of jumping winding connections coupled to the stator core;
a distributed connection assembly coupled to the jumping winding connections, wherein the distributed connection assembly includes:
an overmolded neutral connector; and
a plurality of overmolded couplers circumferentially spaced apart from one another, wherein the plurality of overmolded couplers is coupled to the overmolded neutral connector, each of the plurality of overmolded couplers includes a support body and a plurality of stator conductors partially disposed inside the support body, and the stator conductors are electrically connected to the jumping winding connections, the overmolded neutral connector has an arcuate shape, each of the overmolded couplers have an arcuate shape that is complementary to the arcuate shape of the overmolded neutral connector, the support body includes a main portion having an inner body surface and an outer body surface opposite the inner body surface, the outer body surface has a convex shape, the inner body surface has a concave shape, the support body includes a first end portion and a second end portion opposite the first end portion, the main portion is disposed between the first end portion and the second end portion, and the first end portion has a width that is smaller than a width of the main portion, the second end portion is larger than the main portion, the plurality of stator conductors includes a first bar conductor, the first bar conductor extends solely through the first end portion of the main portion, the plurality of stator conductors includes a second bar conductor, the second bar conductor extends solely through the main portion and the second end portion, the plurality of overmolded couplers includes solely identical three overmolded couplers, and the second end portion includes two coupling prongs spaced apart from each other to define a recess.

2. The stator assembly of claim 1, wherein the support body includes a polymeric material.

3. The stator assembly of claim 2, wherein the stator conductors include an electrically conductive material.

4. The stator assembly of claim 1, further comprising a plurality of terminals and a plurality of electrical leads, and each of the plurality of electrical leads is electrically connected to a respective one of the plurality of terminals.

5. The stator assembly of claim 4, wherein the recess is sized to partially receive one of the plurality of electrical leads.

6. A stator assembly, comprising:
a stator core defining a plurality of slots spaced apart from each other;
a plurality of bar conductors disposed in each of the slots;
a plurality of jumping winding connections coupled to the stator core;
a distributed connection assembly coupled to the jumping winding connections, wherein the distributed connection assembly includes:
an overmolded neutral connector, wherein the overmold neutral connector has a semi-annular shape; and
a plurality of overmolded couplers circumferentially spaced apart from one another, wherein the plurality of overmolded couplers is coupled to the overmolded neutral connector, the plurality of overmolded couplers are identical to each other, the plurality of overmolded couplers includes solely three overmolded couplers, the plurality of overmolded couplers are discrete components, each of the plurality of overmolded couplers includes a support body and a plurality of stator conductors partially disposed inside the support body, the support body is wholly made of a polymeric material, the support body has an arcuate shape, the support body includes a main body having an inner body surface and an opposite, outer body surface, the overmolded neutral connector is closer to the inner body surface than to the outer body surface of the main body, the outer body surface of the main body has a convex shape, the inner body surface of the main body has a concave shape, the support body further includes first end portion and a second end portion opposite the first end portion, the main body is disposed between the first end portion and the second end portion, the first end portion protrudes directly from the main body of the support body, the first end portion has a first width, the second end portion has a second width, the first width is less than the second width, the stator conductors are made of an electrically conductive material, and the stator conductors are electrically connected to the jumping winding connections.

7. The stator assembly of claim 6, wherein main body has a top body surface and an opposite, bottom body surface, the top body surface and the bottom body surface are both flat, the plurality of bar conductors includes a first bar conductor and a second bar conductor, the first bar conductor extends only through the first end portion of the support body, the second bar conductor extends only through the main body and the second end portion to electrically isolated the second bar conductor from the first bar conductor, second bar conductor includes a plurality of branches, the second end portion is larger than the main body and includes two coupling prongs, the stator assembly further includes a plurality of terminals and a plurality of electrical leads, each of the plurality of electrical leads is electrically connected to a respective one of the plurality of terminals, the two coupling prongs are spaced apart from each other to define a recess configured, shaped, and sized to partially receive one of the plurality of electrical leads.

* * * * *